United States Patent [19]

Williams et al.

[11] Patent Number: 4,493,603

[45] Date of Patent: Jan. 15, 1985

[54] WHEEL CHAIR LIFT APPARATUS

[76] Inventors: Claude E. Williams; F. Alan Gates, both of 832 NW. 1st St., Fort Lauderdale, Fla. 33311

[21] Appl. No.: 346,552

[22] Filed: Feb. 8, 1982

[51] Int. Cl.[3] .............................................. B60P 1/44

[52] U.S. Cl. ...................................... 414/541; 414/921

[58] Field of Search ............... 414/540, 541, 921, 545; 187/25

[56] References Cited

U.S. PATENT DOCUMENTS

| | | | |
|---|---|---|---|
| 3,516,559 | 6/1970 | Walter | 214/75 |
| 3,847,292 | 11/1974 | Williams et al. | 214/75 |
| 4,133,437 | 1/1979 | Gates | 214/75 |
| 4,281,744 | 8/1981 | Koerber | 414/540 X |
| 4,353,436 | 10/1982 | Rice et al. | 414/540 X |

*Primary Examiner*—Robert J. Spar

*Assistant Examiner*—Janice Krizek

*Attorney, Agent, or Firm*—Oltman and Flynn

[57] ABSTRACT

The present wheel chair lift apparatus has a rotatable post at the front of a doorway in the side of a van. A pivotally mounted electric motor rotates this post through a pinion and gear drive at the lower end of the post. A carriage for the wheel chair lift platform is slidable up and down along this post. A vertical lead screw is coupled to the carriage through a ball nut and a lost-motion coupling. The lead screw is driven from an electric motor through gear wheels. The lead screw motor has an electric brake which prevents the screw from turning when the motor is stopped. The lift platform has a pivoted retainer lip at its outer edge which is pulled up before the lift platform can move up or down. Provisions are made for manually moving the platform in case of power failure.

9 Claims, 16 Drawing Figures

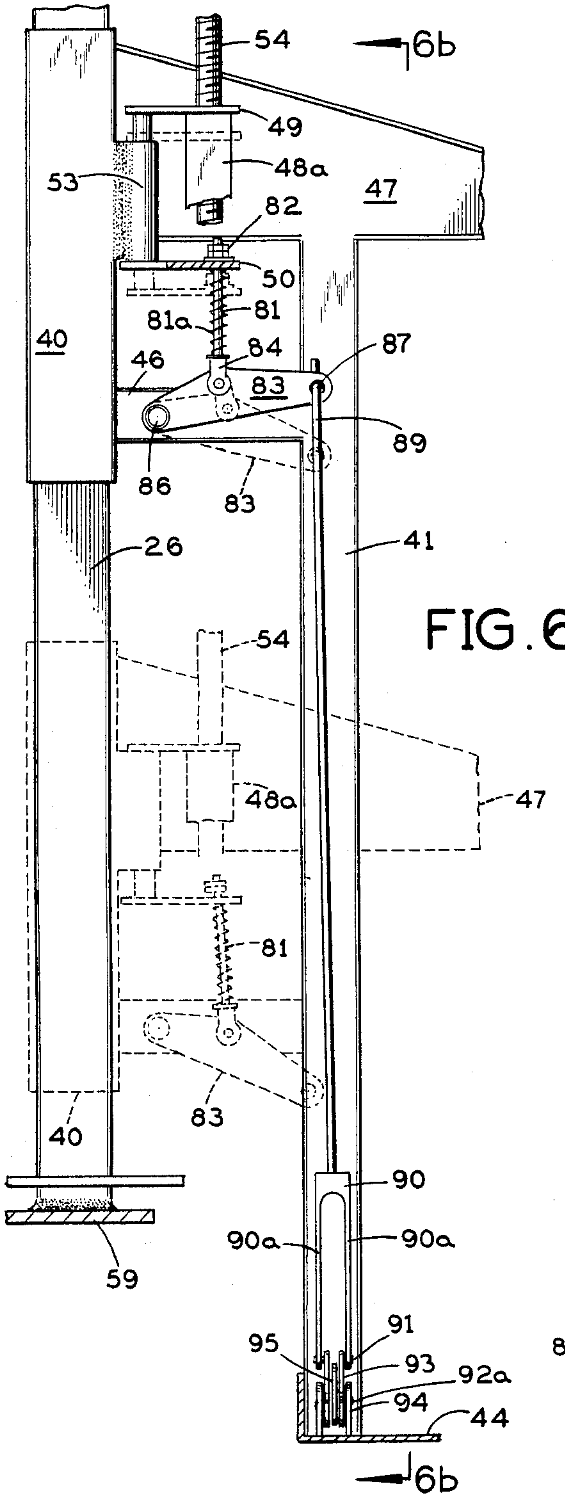
FIG. 6a
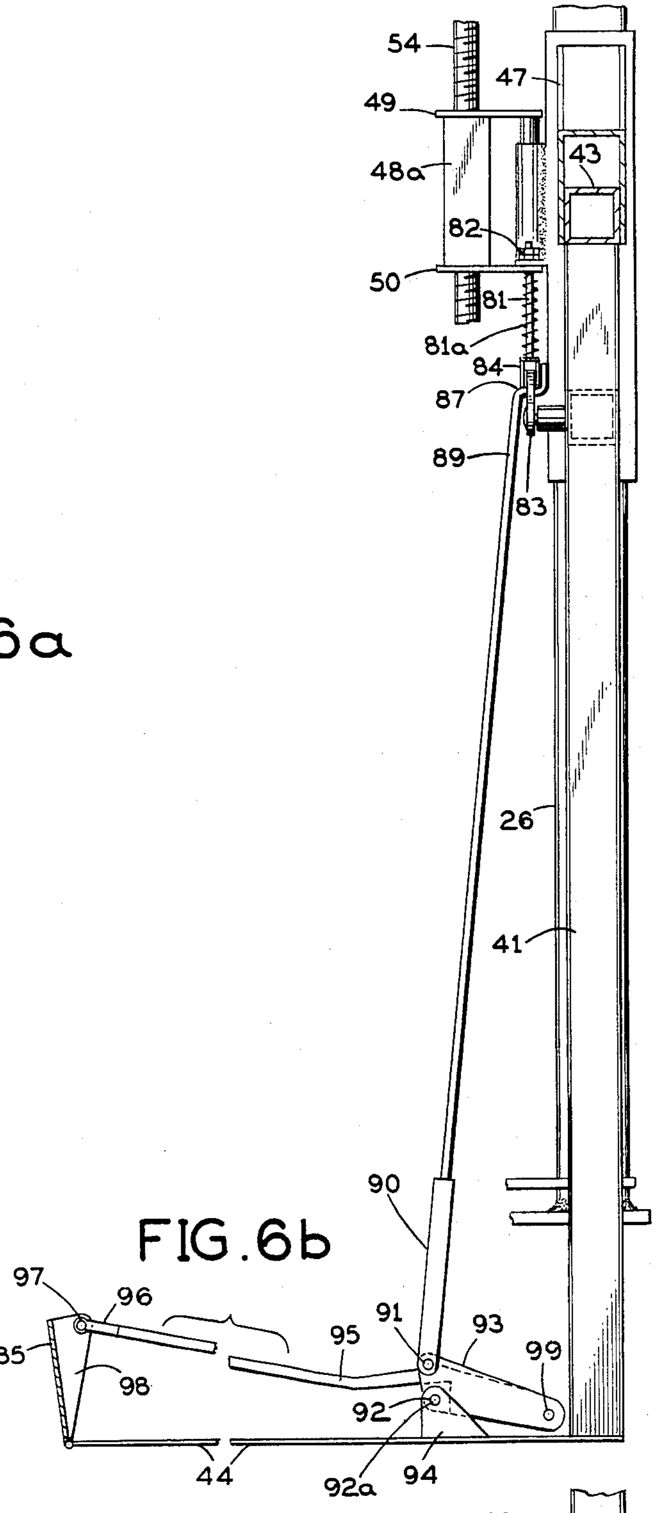
FIG. 6b
FIG. 6c
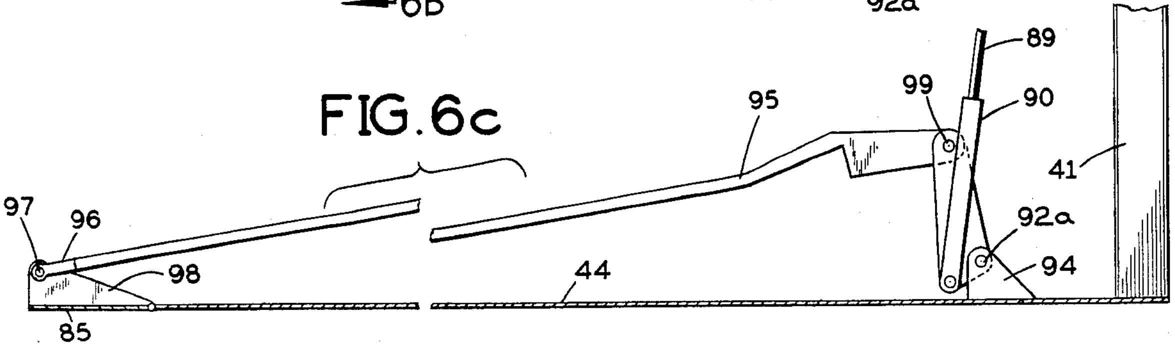

WHEEL CHAIR LIFT APPARATUS

BACKGROUND OF THE INVENTION

This invention relates to a vehicle-mounted wheel chair lift apparatus of the general type disclosed in our U.S. Pat. Nos. 3,847,292 and 4,133,437. The lift apparatus of those patents include a horizontal lift platform which is normally stored in the van. When the occupant of a wheel chair wants to enter the van, the lift platform is raised slightly and then is pivoted horizontally out of the van and lowered vertically. After the wheel chair is on this platform it is elevated to a raised position outside the van and then is pivoted horizontally into the van slightly above floor level and then lowered to floor level. The reverse sequence of operations is carried out when the wheel chair occupant wants to leave the van. Various power-operated devices and controls are provided for affecting these operations with a minimum of effort required of the wheel chair occupant.

SUMMARY OF THE INVENTION

The present invention is directed to a wheel chair lift apparatus of the same general type but with several modifications to simplify and improve the reliability and safety of its operation In the presently-preferred embodiment of this invention the raising and lowering of the lift platform is effected through a vertical lead screw which drives a ball nut. Preferably, a lost motion coupling is provided between the ball nut and a carriage which is slidable vertically along a rotatably supported post. The carriage is coupled rigidly to the lift platform. The lost motion coupling delays briefly the up movement of the carriage and the lift platform when the lead screw first begins to turn in upward direction.

In this embodiment the lead screw is driven through a speed reducing gear wheel drive at its lower end from an adjacent electric motor. A brake applies friction to the motor to prevent the lift platform from coasting down when power to the motor is stopped. This brake automatically locks the lead screw when the motor stops.

The vertical post is rotated by a second electric motor through a gear drive. This motor is pivotally mounted at the floor of the vehicle for selectively disconnecting this gear drive.

The lift platform has a pivoted retainer lip at its outer edge for preventing the wheel chair from rolling off. This lip is raised by the ball nut whenever the lead screw is supporting the weight of the lift platform.

The lift platform also may have a slidable extension which is engageable by the wheels of the wheel chair to enlarge the effective size of the lift platform when the wheel chair rolls onto it.

A principal object of this invention is to provide a novel and improved wheel chair lift apparatus on a motor vehicle, particularly a van.

Another object of this invention is to provide such an apparatus which is relatively simple mechanically while at the same time being reliable and safe in operation.

Another object of this invention is to provide a novel wheel chair lift apparatus on a vehicle which uses a motor-driven vertical lead screw for raising and lowering a horizontal lift platform.

Another object of this invention is to provide a lift apparatus as just mentioned in which the lead screw is driven through speed reducing gear drive provided with a frictional restraint for preventing the lift platform from coasting down when the lead screw drive motor is stopped.

Another object of this invention is to provide a novel wheel chair lift apparatus having a vertical lead screw for raising and lowering the lift platform, a vertically reciprocable carriage rigidly connected to the lift platform, and a novel lost motion coupling acting between the lead screw and the carriage.

Another object of this invention is to provide a novel wheel chair lift apparatus as just described which has a hinged wheel chair retainer on the lift platform which is coupled to the lead screw substantially without lost motion so as to be raised to its wheel chair retaining position substantially as soon as the lead screw is turned in direction for raising the lift platform through the lost motion coupling and carriage.

It is a further object of the invention to provide a wheel chair lift apparatus with simplified operation by means of limit switches which control the outer limits of the vertical and pivoting motion of the lift platform.

It is a still further object of the invention to provide wheel chair lift apparatus with means for operating the wheel chair lift in case of power failure.

Further objects and advantages of this invention will be apparent from the following detailed description of a presently-preferred embodiment thereof, which is shown in the accompanying drawings in which.

FIG. **6*a*** is a vertical elevational, part cross-sectional view of the actuating train for retracting the retaining lip showing the actuating elements in their raised position in solid lines and in their lowered position in phantom lines, with the platform in a partially lowered position outside the van seen from the rear of the van;

FIG. **6*b* is a vertical elevational part cross-sectional view of the actuatng train for raising the retaining lip with the actuating elements in their raised position seen along the line 6*b*—6*b* in FIG. 6*a*;**

FIG. **6*c* is a vertical elevational, part cross-sectional view of the lower actuating elements of the actuating train showing the elements in their lowered position with the retaining lip in the horizontal retracted position seen along the line 6*b*—6*b* in FIG. 6*a*;**

Figure 6:
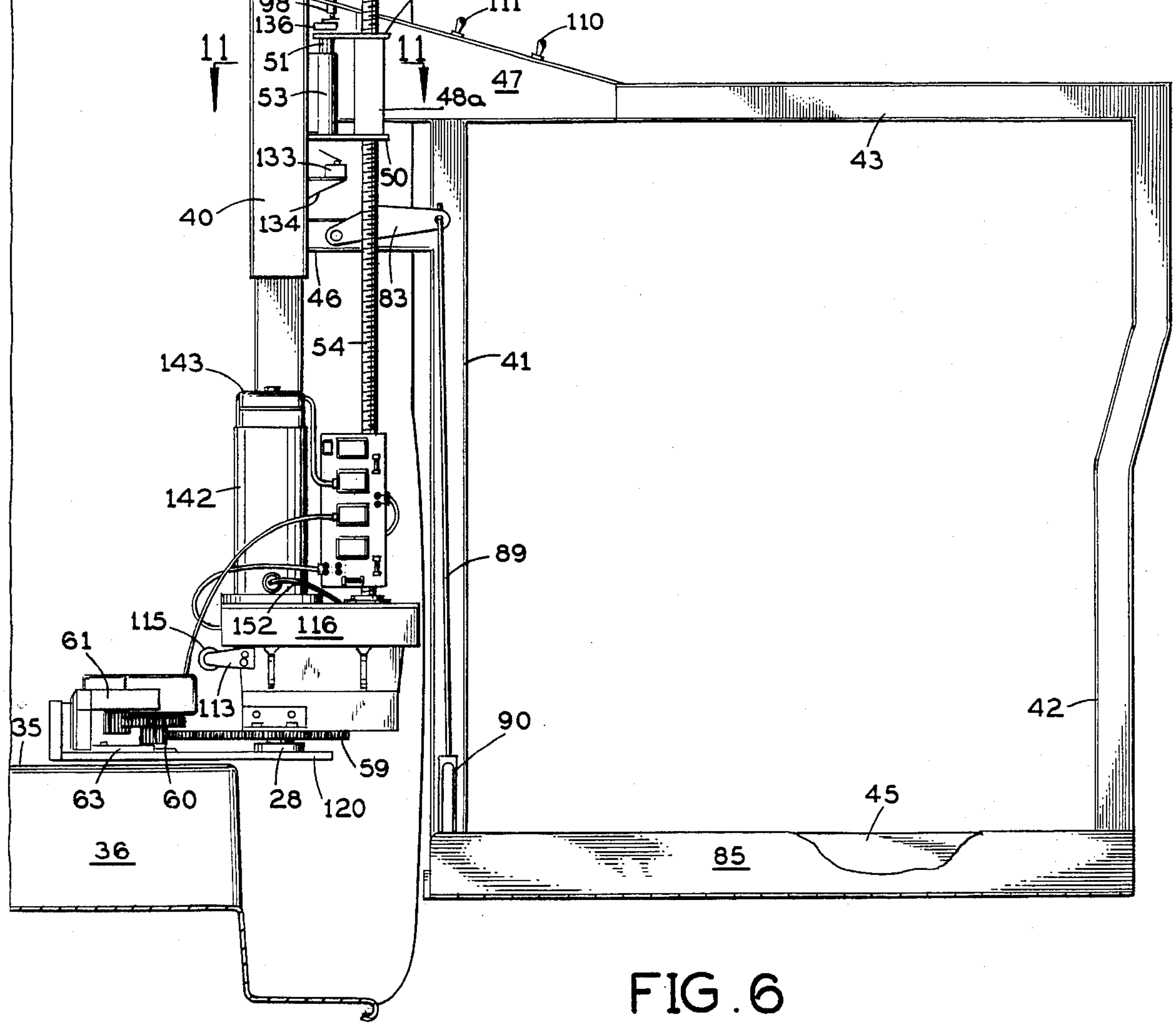
FIG. 6 is a vertical elevational view of the lift apparatus showing the carriage and lift platform outside the van in partially lowered position with the retaining lip in its raised position with part broken away to show the fixed rear retaining lip.
Figure 7:
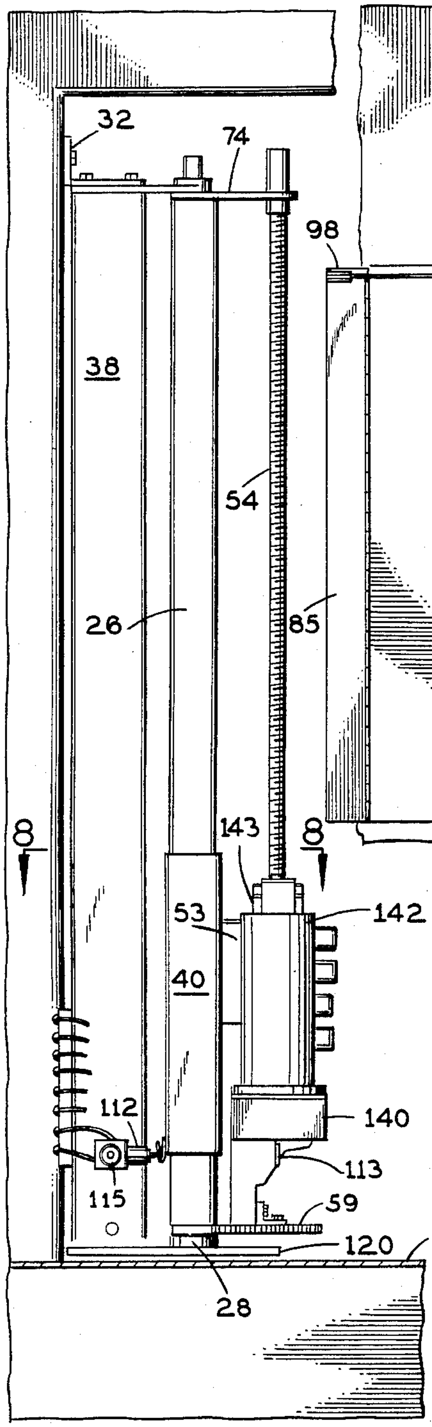
Figure 8:
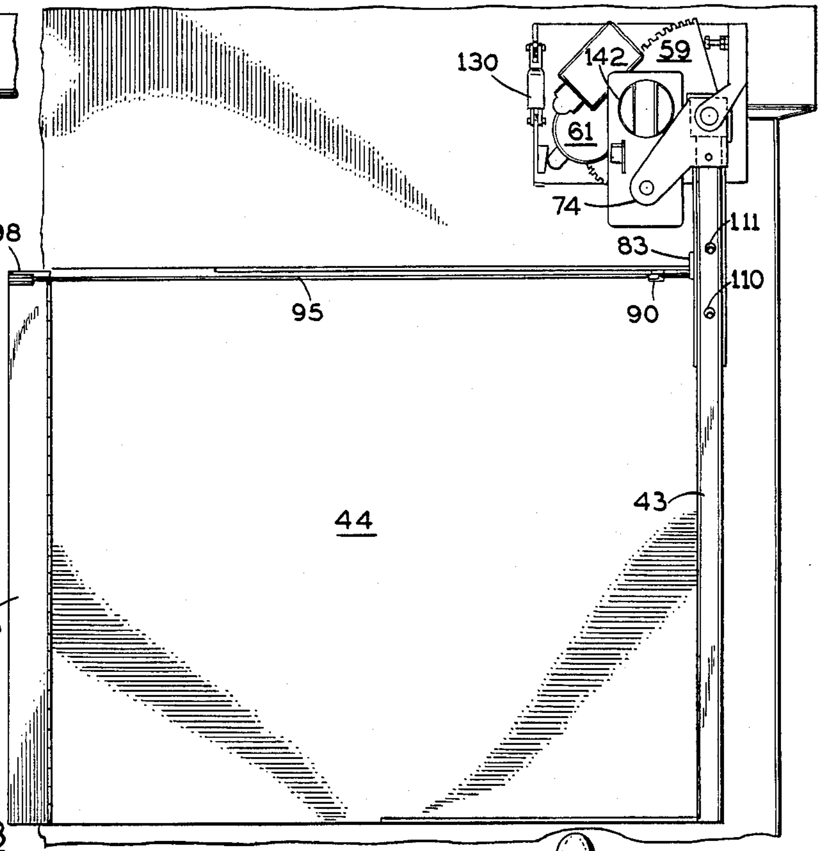
Figure 9:
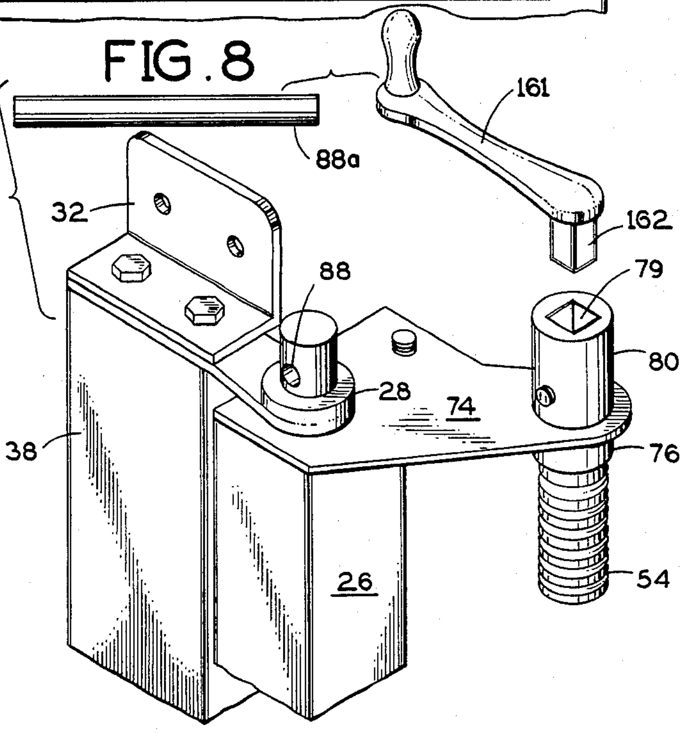
Figure 10:
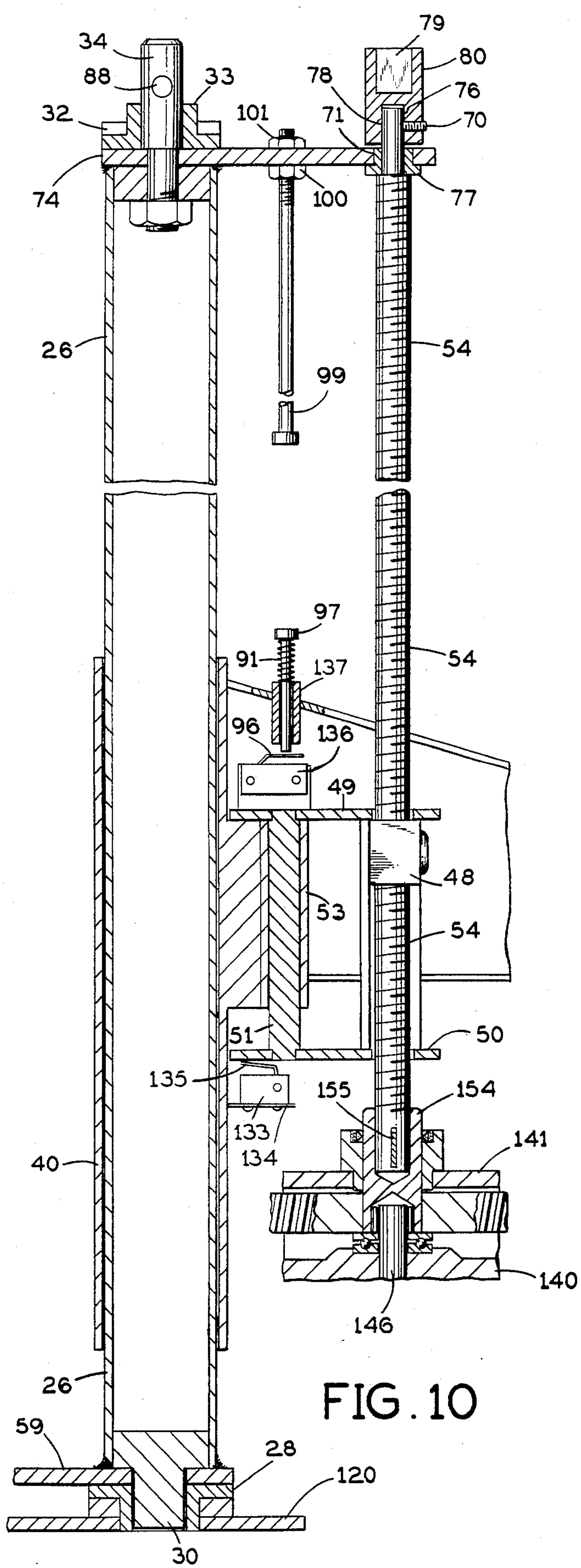
Figure 11:
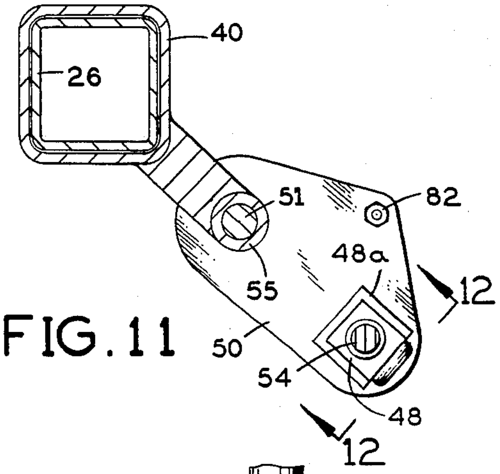
Figure 12:
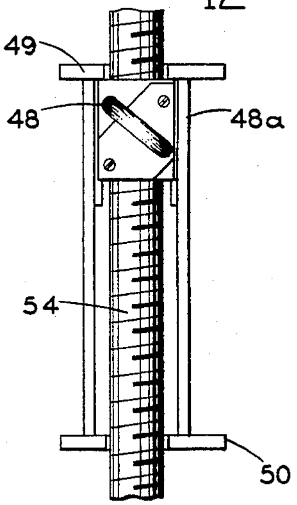
Figure 13:
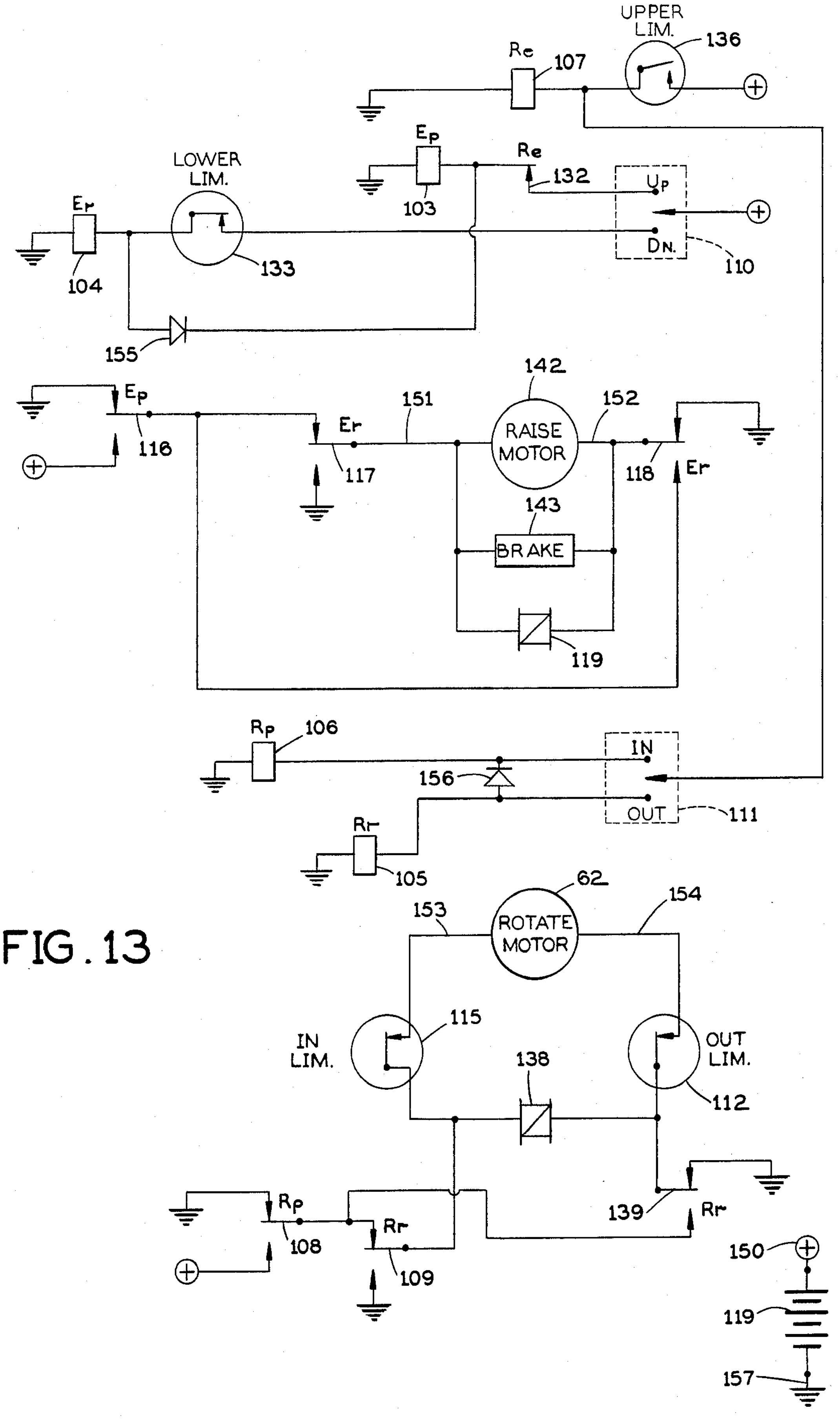

FIG. 7 is a vertical elevational view of the rotatable post with the carriage in its lowest position with the lift platform outside the van operating the outer limit switch, looking out from inside the van;

FIG. 8 is a horizontal fragmentary view of the lift platform in its position inside the van and showing part of the retainer lip in its lowered position and details of the rotatable post with pivoting drive motor and lead screw drive motor, seen along the line 8—8 in FIG. 7, and the inner limit switch for the pivoting motor;

FIG. 9 is a part fragmentary perspective view of the upper part of the rotatable post and of the lead screw showing details of means provided for operation in case of power failure;

FIG. 10 is a vertical cross-sectional view of carriage and lead screw with upper and lower pivot pins in bushings;

FIG. 11 is a horizontal cross-section of pivot post and lead screw seen along the line 11—11 in FIG. 6;

FIG. 12 is a vertical view showing part of the lead screw and ball nut end assembly in the lift apparatus; and FIG. 13 is a circuit schematic diagram of the electrical control circuit showing the manual switches and limit switches power source and relays.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

The invention is illustrated herein as applied to an automotive van 20 (FIG. 1) having a sliding door 22. A particular embodiment of the invention has been installed on a Chevrolet sliding door van 10 series. However, it will be understood that the invention may be applied to other vehicles.

In the van 20 the driver's seat is removed so that a wheel chair 24 can be positioned under the steering wheel. The van is especially equipped to enable the occupant of the wheel chair to drive the vehicle seated in the wheel chair 24 even though the driver may be partially disabled. Preferably, the van 20 has power brakes, power steering and automatic transmission, and suitable controls are provided in known manner (not shown) to enable the occupant of the wheel chair to drive the van. The invention is not specifically directed to these driving controls, so they are not illustrated herein.

A support 26 in the form of a squared tubular post is mounted inside the vehicle at the front edge of a door opening 52 in its right side. The door opening is normally closed by a sliding door 22. In FIGS. 6 and 10 support post 26 is rotatably mounted on a base 120. The lower end of post 26 is attached to a reduced cylindrical pivot pin 30 (FIG. 10) which is rotatably received in the bushing 28 attached to base 120. At the upper end of post 26 a similar pivot pin 34 is rotatably received in bushing 33 carried by an upper bracket 32 near the top of the door opening 52. As shown in FIGS. 6, 7 and 10, the base 120 is mounted on the floor 35 of the van, and the bracket 32 is attached to a door post 38 so that the post 26 is located inside the vehicle.

Figures 1, 2, 3:
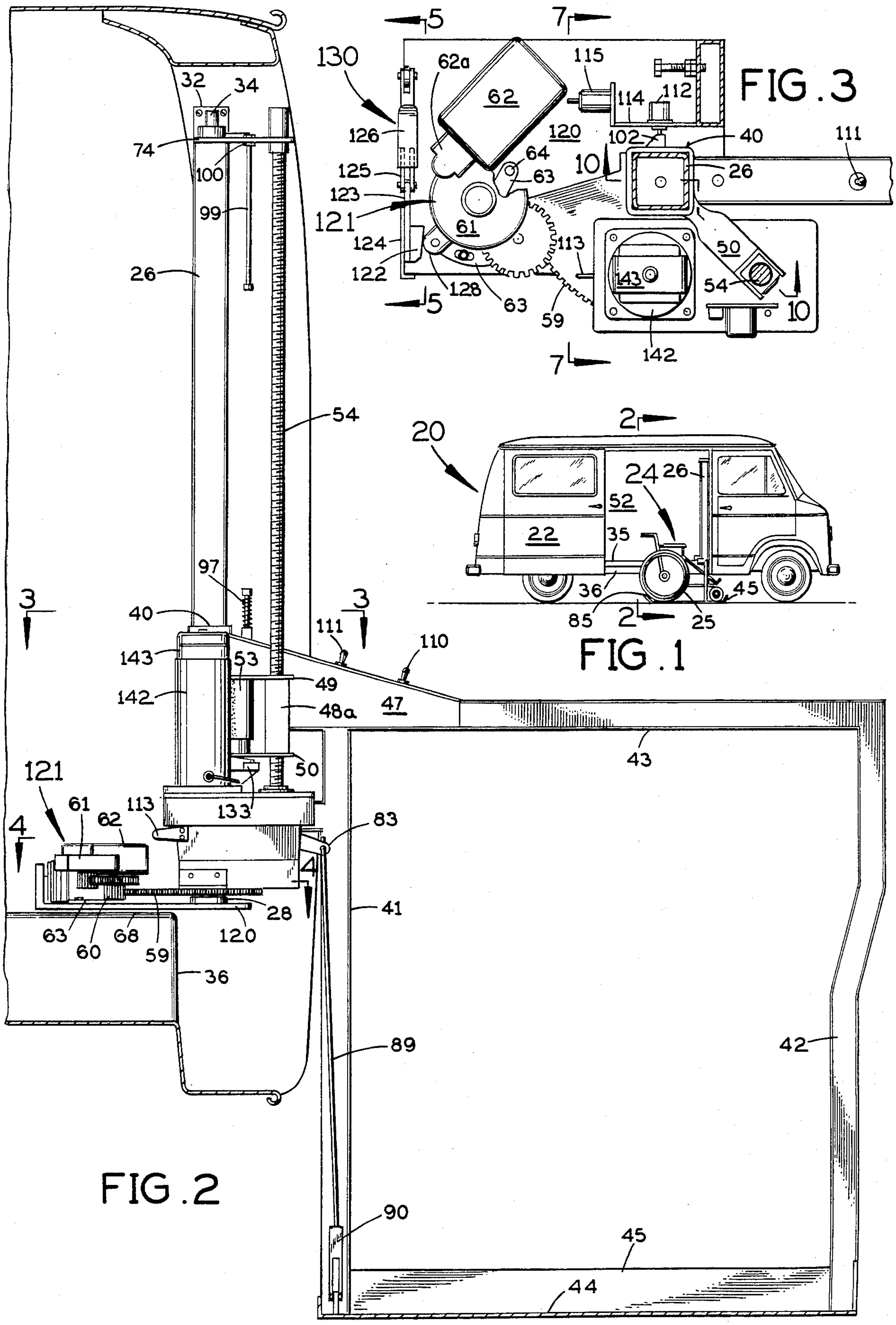
FIG. 1 is an elevational view of a van with its sliding side door open and with the present wheel chair lift lowered outside the van.
FIG. 2 is an elevational, part cross-sectional view of the present lift apparatus in its lowered position outside the van seen along the line 2—2 of FIG. 1.
FIG. 3 is a horizontal cross-section taken along the line 3—3 in FIG. 2.

A carriage 40 of tubular square cross-section is slidably mounted on the outside of the post 26 for up and down movement. A lift platform 44 is rigidly attached to the vertically slidable carriage 40 by means of rigid, interconnected brace members 41, 42 43 and 47, as best seen in FIG. 2. These brace members form a rigid frame suspending the lift platform 44 from the carriage 40 such that the carriage, frame and platform can move together up and down along the support post 26. The frame and platform are also movable horizontally in and out of the doorway 52 when the door 22 is open since the support post 26 is rotatable relative to the base 120 and the bracket 32.

A ball nut 48 (FIGS. 11 and 12) is carried by a three-sided rectangular bracket or housing 48*a* which, as shown in FIG. 10, extends vertically between upper and lower horizontal plates 49 and 50 and is welded to both of them. A vertical guide post 51 extends between the upper and lower plates 49 and 50 near the vertically slidable carriage 40. A vertical sleeve 55 (FIG. 11) is welded at 53 to the carriage 40 and slidably receives the guide post 51. The sleeve 55 is shorter than the guide post 51 and therefore the unitary assembly of the ball nut carrier 48*a*, upper and lower plates 49 and 50, and the guide post 51 can move up and down a limited amount with respect to the sleeve 55 (FIG. 11) and the carriage 40 which supports the sleeve.

The ball nut 48 engages a vertically elongated lead screw 54. FIG. 10 shows the lower end of this lead screw fitting in bushing 154 keyed with key 155.

A horizontally disposed gear sector 59 (FIGS. 2, 3, 4, 6 and 7) is welded to the post 26. This gear sector is engaged by a pinion 60 drives through a gear reduction unit 61 from an electrical motor 62. This post drive motor and gear reduction unit is mounted as a sub-assembly generally at 121 on FIGS. 2 and 3 on a generally horizontal panel 63 which is attached pivotally to a short vertical post 64 which is rigidly attached to the base plate 120. The base plate 120 is bolted to the floor 35 of the van. The pinion 60 which is normally in engagement with the gear sector 59 may selectively be disengaged therefrom by pivoting the entire sub-assembly 121 about the vertical post 64.

Figure 4:
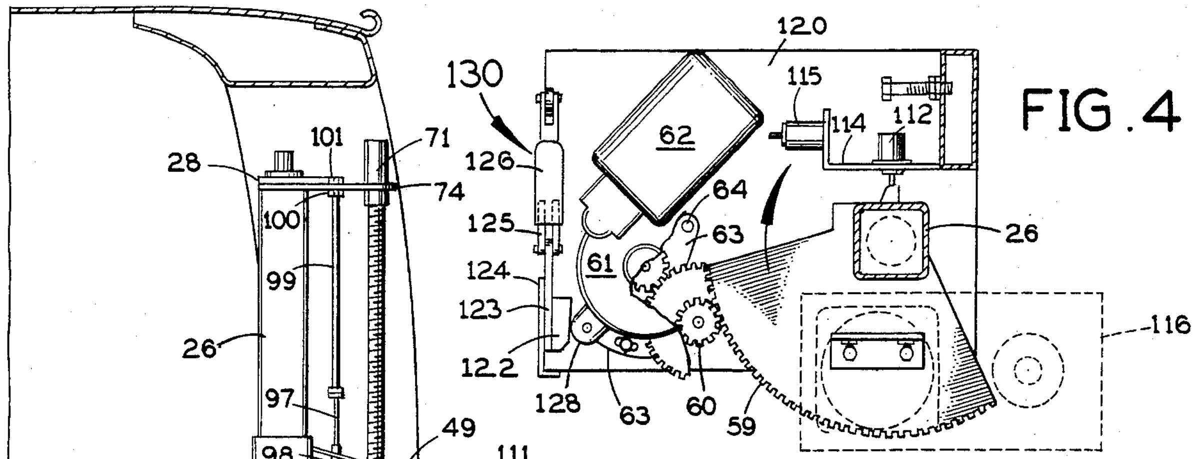
FIG. 4 is a fragmentary horizontal view showing part of the gear drive and motor operating the pivoting carriage and the lift platform seen along the line 4—4 of FIG. 2.
Figure 5:
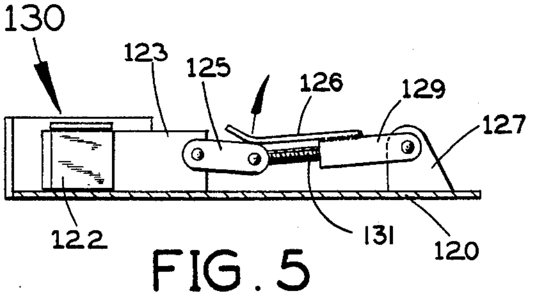
FIG. 5 is a part cross-sectional view of the horizontal cross-section of FIG. 3 along the line 5—5 showing the latch and wedge operating to selectively disengage the pivoting motor and gear assembly.

During normal operation the sub-assembly 121 is maintained in its engaged position by means of a group of elements generally at 130 in FIG. 4 comprising wedge 122 normally positioned between an extension 128 of the gear reduction unit 61 and a horizontally disposed elongated vertical plate 124 which is rigidly attached to the base plate 120. The wedge is rigidly attached to a horizontally disposed, elongated, horizontally movable plate 123 which is best seen in FIG. 3 and in a vertical elevation in FIG. 5, which shows a view of the aforesaid elements 130 of the mechanism serving to control the engagement or disengagement of the sub-assembly 121, seen along the line 5—5 of FIG. 3. The elongated horizontally movable plate 123 is at the end opposite the end attached to the wedge, pivotably connected to two links 125, which are in turn pivotably connected to the end of a threaded rod 131, (FIG. 5) which is screwed into a tubular, internally threaded member 129, which is, in turn pivotally connected to a vertical projection 127, rigidly attached to the base plate 120. The tubular member 129 has on its upper surface, welded thereto, a generally horizontal handle 126. The elements generally shown at 130 are shown in their normal position where the pivotable sub-assembly generally shown at 121 is engaged with the gear sector 59.

The upper end of the lead screw 54 (FIG. 10) is reduced in diameter to form pivot pin 76, pivotally positioned inside bearing 77 which in turn is tightly fitted in an aperture 71 in upper horizontal bracket 74. The pivot pin 76 extends a distance beyond the bearing 77 such as to provide a cylindrical extension generally at 78.

The extension at 78 serves to support a cylindrical collar part 80, which has at its lower end a concentric cylindrical bore, matching extension 78 in a tightly fitting connection. To further secure the connection, set screws 70 are positioned in threaded holes in the perimeter of collar part 80. The collar part 80 has in its upper end a square hole 79, which serves to receive a matching squared tap on a hand crank (FIG. 9) which serves to rotate the lead screw in case of power failure.

Aforesaid horizontal bracket 74 is also seen in perspective view in FIG. 9 and in an elevational end view in FIG. 2. As described above, one end of bracket 74 supports the upper end of the lead screw 54, while the other end of the bracket is rigidly attached to the upper end of the pivotable tubular post 26, such that as post 26 pivots about its vertical axis, bracket 74 being attached thereto, pivots therewith.

A drive motor 142 (FIGS. 2 and 6) is positioned vertically on top of the gear box 140 and attached thereto. The motor 142 and the gear box 140 which are readily available construction parts are obtainable from various sources and are therefore not described in detail here. A power cord 152 connects the motor 142 with the electrical control system.

The motor 142 has at its upper surface rigidly attached thereto an electrically controlled brake 143. The brake is internally, mechanically connected with the drive shaft of the motor such that, when the motor and the brake are not energized, the brake will produce a frictional drag which will restrain the motor shaft from turning.

It is an important safety aspect of the present invention that the lead screw 54 is frictionally restrained from rotating when the drive motor 142 is not energized. The weight of the lift platform and the very low friction between the lead screw would tend to produce slow rotation of the lead screw that would cause the lift platform to coast down when the motor 142 is not energized.

In accordance with another important aspect of this invention, and as shown in FIG. 6, **6*b*, 6*c* and 8 the horizontal lift platform 44 is provided with a pivotable retaining lip 85 at its rear outer edge. Normally, when the platform is resting on the ground or the van floor as shown in FIG. 8, this lip extends horizontally substantially co-planar with the floor of the lift platform 44. After the wheel chair is on the lift platform, the lip 85 may be pivoted up to the upwardly projecting position (shown in FIGS. 1, 6 and 6*b*) behind the adjacent wheel 25** of the wheel chair, so that the wheel chair cannot accidentally roll off the lift platform.

The lip 85 is pivotally actuated through an actuating train of elements shown in detail in FIGS. **6*a*, 6*b* and 6*c***.

The actuating train consists of a first actuating rod 81 attached at its upper end by means of two lock nuts 82 to the lower horizontal plate 50 of the ball nut housing **48*a* and at its lower end vertically pivotally attached at 84 to the lever 83. A helical spring 81*a*, disposed concentrically with first actuating rod 81 rests at its upper end against the lower surface of plate 50 and at its lower end against the upper surface of lever 83, thereby exerting a moderate downward pressure against lever 83. Lever 83 is attached vertically pivotally to the horizontal brace member 46 at its innermost end at 86. The lever 83 is at its outermost end, at 87, in a loosely jointed connection attached to the upper end of second actuating rod 89, which, at its lower end is rigidly attached to stirrup member 90, shaped like an inverted letter U with two downward facing prongs 90*a***.

Each of the two prongs **90*a* is at its lower end pivotally connected with the upper apex of two identical pivotable actuators 93, shaped as two obtuse triangles disposed in two vertical parallel planes. Said actuators are pivotally at 92, by means of pivot pin 92*a*, attached to a projection 94 which is, in turn, rigidly attached to the upper surface of platform 44. The third apex of said actuators is at 99 pivotally connected with one end of the generally horizontally oriented actuating bar consisting of two sections 95 and 96, where 96 is constructed as two parallel bars welded to each vertical side of section 95. Section 96 is at its other end pivotally connected with projection 98 which is in turn rigidly attached to the upper surface of aforesaid retaining lip 85**.

In the above description, the train of actuating elements are all shown in FIGS. **6*a* and 6*b* in full lines in the position that will exist at the time when the platform 44, attached to slidable carriage 40, is being supported by the lead screw 54, in other words at the time when the platform is not resting on the ground or on the floor of the van. In this condition all the elements are in the position shown in full lines on FIGS. 6*a* and 6*b*. In this position the ball nut assembly 48*a* is in its upper position relative to the sleeve 55 and carriage 40, as is the lever 83, second actuating rod 89, stirrup 90 with its point of attachment 91 to the triangular actuators 93. With attachment point 91 being raised and pivot point 92 of the actuator being in a fixed position in relation to the floor of the platform, it follows that the triangular actuators will be in their position shown in full lines in FIGS. 6*a* and 6*b* with the pivot point 99 in its outermost position pulling actuator bar 95 in a direction away from retainer lip 85** holding it in its pivoted upper position, such that a wheel chair situated on the platform is prevented from rolling off.

Conversely, when the platform is lowered to the point that it makes contact with the van floor or the ground beside the van, the lost motion of the ball nut assembly **48*a* comes into play. In this condition the platform 44 with carriage 40 and sleeve 55 stops in its downward movement, but the lead screw 54** continues to move the ball nut housing another short distance downward until the motor driving the lead screw is stopped as the lower limit switch is actuated as described later under the description of the control apparatus.

As the ball nut housing **48*a* is lowered to its lowest position as indicated by phantom lines in FIG. 6*a*, relative to the sleeve 55 and carriage 40, all the elements of the actuating train will be in their lower positions, as shown in phantom lines. In this position, as shown on FIG. 6*c*, the triangular actuators 93 wil be rotated counterclockwise about pivot point 92 approximately 90 degrees, and the point 99 of attachment of the outer end of actuating bar 95 and 96 will describe an arch of also approximately 90 degrees thereby pushing the actuating bar 96 toward its outermost position shown in FIG. 6*c*, where the outermost end of the actuating bar attached to the pivotable retainer lip at point 97 will operate to pivot said retainer lip to its lower position where it is generally co-planar with the surface of aforesaid platform 44**. In that position the wheel chair can freely be rolled onto or off the platform.

When the actuating train elements are in their uppermost positions as shown in solid lines on FIGS. *6a* and *6b*, the actuating bar 95 and 96, as described above will be in its innermost position with the retaining lip 85 in the upper position. In this position the three points, pivot point 97 of the connection between the actuating bar and the retaining lip 85, pivot point 92 of the connection between triangular actuators 93 and projection 94 and pivot point 99 of the connection between the actuating bar 95 and the triangular actuators 93 will all be positioned on a straight line, so that the pivot point 99 will be on-center with pivot points 92 and 97. As a result, no amount of pressure exerted against the retaining lip in the direction from the platform toward its rear edge will cause the triangular actuators to be pivoted counterclockwise thus allowing the retaining lip to yield to the pressure. This arrangement affords an important safety feature in protecting the wheel chair's position on the platform.

A lower limit switch 133 (FIG. 10) is carried by a bracket 134 welded to the vertically slidable carriage 40. The movable actuator 135 for this switch is positioned to be engaged by the lower plate 50 which is part of the lost motion coupling between the ball nut 48 and the carriage 40. When the weight of this carriage with the rigid framework 41, 42, 43, 45 and 47 and the lift platform 44 is not being carried by the lead screw 54, such as when the lift platform is resting on a sidewalk or on the van floor, the switch actuator 135 will be engaged by plate 50 as shown in FIG. 10 and the contacts of switch 133 will be open. When the lead screw 54 is supporting the weight of the lift platform, carriage and framework, the lower plate 50 will be displaced up away from engagement with the switch actuator 135 and the contacts of switch 133 will be closed. Thus, the switch 133 senses whether or not the lead screw is carrying this weight.

Limit switch 133 is operatively electrically connected to the motor 142 for stopping the latter when the lift platform can be lowered no farther. A manual switch is provided for raising and lowering the lift platform. With the manual switch held in its "lower" position, the platform will come down until limit switch 133 is operated (opened), de-energizing the motor 142.

A normally open upper limit switch 136 (FIG. 10) with a pivoted actuator 96 is mounted on the vertically slidable carriage 40. The movable actuator 96 is positioned such as to engage with the lower end of slidable upper stop post 97 when said carriage enters the limit of its upper vertical travel. Said slidable upper stop post 97 is slidably vertically contained in bushing 137 such that said stop post is restrained to slide vertically axially inside said bushing. The upper end of said stop post 97 is positioned such that when said carriage enters the upper limit of its travel, a vertically fixed stop post 99 positioned coaxially with and above said lower stop post 97 and attached at its upper screw-threaded end to aforesaid support plate 74 by means of two threaded nuts 100-101 with one nut on each side of aforesaid support plate and with the upper post end positioned through a clearance hole in said plate.

As seen in circuit schematic diagram FIG. 13, and as described in greater detail below, switch 136 controls the lead screw drive motor 142, such that a continuous electrical power connection is maintained from the van's power bus 150 through that side of the toggle switch 110 that, when manually operated to the "up" position serves to energize the side 151 of the drive motor 142 that, in turn, drives the lead screw in such rotational direction that the lift platform 44 is raised. As the platform reaches its upper limit, aforesaid stop posts 97 and 99 mutually engage. Ihe lower post 97 is driven downward against switch actuator 96 which normally maintains post 97 in its upper position aided by the helical spring 91, thereby causing switch actuator 96 to operate the switch 136 such that its contacts are opened, thereby causing removal of power to the motor 142 and stopping the upward motion of the lift platform. As power is first applied to the motor, the friction brake 143 is simultaneously powered, thereby disengaging the brake, allowing the motor to rotate. As power to the motor and the brake is again disconnected, as the platform reaches its upper limit, the brake is again engaged, holding the motor in its stopped position.

Conversely to the upward movement of the lift platform, the downward movement is performed by manually operating the toggle switch 110 to its DN position. In this case the lead screw drive motor 142 is energized at its reverse rotation side 152, causing the motor to lower the platform. Power to drive the motor in its reverse rotation passes through the lower limit switch 133, which at this time has its contacts closed, because the weight of the platform holds the ball nut housing 48*a* in its upper lost motion position, which, as explained above, maintains the limit switch 133 with its contacts closed. At the end of its vertical downward travel, when the lift platform reaches either the ground or the floor of the van, the weight of the platform will no longer be borne by the lead screw, the ball nut housing will move to its lower lost motion position where the limit switch 133 will be actuated and its contacts opened, thereby removing power to the motor 142 with the brake 143 and the motor will stop.

In a manner similar to the up and down motion of the lift platform, the motor 62 with brake 62*a* which drives the platform to its "in" or "out" position, is controlled by a toggle switch 111 which, like toggle switch 110, has two nonlocking positions namely "in" and "out" and a neutral center position.

Assuming the platform is inside the van and it is desired to operate the drive motor to rotate the platform to its "out" position, the toggle switch 111 is manually operated to its "out" position, thereby causing the energizing of the drive motor 62 to the side 154 that causes the motor to rotate in the direction that causes the platform to rotate out of the van. Conversely, when it is desired to rotate the platform in the direction of "in", toggle switch 111 is manually operated to its nonlocking position "in" which energizes the motor 62 to rotate in the "in" direction.

As is the case with the up and down movement of the lift platform, the rotate "in" and "out" movements are controlled by two limit switches 112 which serves to stop the out movement and 115 which serves to stop the in movement. Limit switch 112 in FIG. 3 is mounted on bracket 114 which is rigidly attached to the base plate 120, and is stationary in relation to the platform. An actuator 113, best seen on FIG. 2, is attached to vertical base plate 116 which is again attached to gear wheel sector 59.

Actuator 113, being attached to gear wheel sector 59, rotates in a horizontal plane about the vertical axis of rotatable post 26 when the lift platform rotates between its extreme "in" and "out" positions, such that, as the platform rotatably reaches the limit of its "in" movement, actuator 113 engages limit switch 115 to operatively de-energize the inward driving side 153 of motor 62. Conversely, as the lift platform rotates in the "out" direction, as it reaches its extreme "out" position, actuator 102 engages limit switch 112 attached to bracket 114 such that the outward driving side of motor 62 is de-energized and the motor is stopped.

Circuit schematic diagram FIG. 13 with additional components of the control system for the motors driving the lift platform in its vertical and rotational movements is described in more detail below. The motors 62 and 142 are reversible DC motors constructed to operate from the 12 volt DC power system of the van. Only the van storage battery 119 is shown, but not the means for charging the battery which usually consist of a generator driven by the van's engine.

Each of the motors 142 and 62 has two power connections, one for each direction of rotation of the motor. Motor 142, when energized at its connection 151 will drive the lead screw in a direction such as to raise the platform, while connection 152 will energize the motor to lower the platform. Similarly, the rotate motor 62 has power connections 153 and 154 which will energize the motor to rotate the platform in the "in" and "out" direction respectively.

The toggle switches 110 controlling the up and down movement of the platform and 111 controlling the in and out movement each have three positions, namely an upper nonlocking, a neutral center and a lower nonlocking position. These toggle switches have contacts with relatively low power ratings, typically a few amperes at 12 volts DC current which is inadequate to operate the motors. Therefore, four relays 103, 104, 105 and 106 labelled Ep, Er, Rr and Rp respectively are controlled by the toggle switches such that the relay contacts with much higher power ratings, typically in the range of tens of amperes at 12 volt DC current, are used to energize the motors.

A fifth relay 107, labelled Re, serves to disable the rotational movement of the chair lift apparatus at all times when the chair lift is not in its uppermost position. This disabling feature serves as a safety feature since an attempt to operate the rotational apparatus could cause structural damage and possibly personal injury unless the platform is in its upper position where it can rotate freely.

The circuit operates as follows:

In order to initiate movement of the platform in the "up" direction, toggle switch 110 is operated to its "up" position, thereby connecting power through a pair of break contacts 132 of relay Re (107) to the operating coil of relay Ep (103) which operates such that its transfer contacts 116 remove ground and connect power through the break side of Er contacts 117 to the side 151 of motor 142.

At the same time ground potential is maintained to the other side 152 of the motor and the brake 143 is energized, removing the braking hold on the motor. As a result the motor starts turning in the direction to raise the platform. As the platform reaches the upper limit of its travel, the normally open limit switch 136 is operated and closes its contacts causing relay Re (107) to operate and open its contacts 132, which removes power from relay Ep which in turn removes power from the motor 142 and restores ground potential. The brake 143 is again activated and prevents the motor from turning. The platform can now be rotated out of or into the van as the case may require by operating toggle switch 111 to the "in" or "out" position. Assuming the platform has to be rotated to the "In" position, toggle switch 111 by being operated to "In" applies power to relay coil Rp (106) from the contacts of the now closed upper limit switch 136. Relay Rp through transfer contacts 108 removes ground potential and instead connects power to the side 153 of the rotate motor 62 through the break side of contacts 109 of relay Rr (105), and through the break contacts of limit switch 115 which causes the motor to rotate in the "In" direction rotating the platform into the van until the limit switch "In" is operated, thereby removing power from the rotate motor. Conversely, if platform is to be rotated out of the van, toggle switch 111 is operated to the "out" position, energizing relay Rr (105). A rectifier diode 156 is connected from the "out" terminal of switch 111 to relay Rp(106) which is also energized since the diode allows a positive potential to be conducted in the direction from the "Out" terminal to relay Rp (106). Since both relays Rp and Rr now operate, transfer contacts 108 of Rp will connect power to the make side of transfer contacts 139 of Rr which in turn connects power through limit switch 112 to the side 154 of the rotate motor 62 which causes the motor to rotate in the direction to rotate the platform out of the van. The outward rotation continues until limit switch "Out" (112) is operated thereby stopping the rotation of the motor and the platform.

At the completion of the "In" or "Out" rotation, the platform must again be lowered, either to the floor of the van or to the ground outside the van, as the case may require. Lowering the platform is performed by operating the toggle switch 110 to the "DN" position whereby power is connected from the toggle switch through the break contacts of lower limit switch 133 to relay Er which operates. At the same time relay Ep is operated by power conducted through rectifier diode 155 to the coil of Ep. With both Ep and Er operated power is connected to the side 152 of the raise motor 142 from the make side of Ep contacts 116 through the make side of Er contacts 118, while ground potential is connected to side 151 through the make contacts of Er contacts 117. At the same time the brake 143 is again energized. In this condition the raise motor 142 is energized to rotate in the "Down" direction. The motor will continue to turn until the lower limit switch 133 is operated to open its contacts. As described above, the lower limit switch is operated at the end of the "lost motion" travel of the ball unit housing **48*a* which takes place a short distance after the platform has touched either the floor of the van or the ground outside the van. Limit switch 133 operating removes power from both relays Er and Ep, such that ground potential is again connected to both sides of the motor 142 and the brake 143, and the motor stops with the retainer lip 85 on the platform in its lower position, such that the wheel chair can be rolled onto or off the platform as required. Two transient absorbers 119 and 138** are connected across the terminals of each motor. These absorbers are normally non-conducting at potentials of approximately 15 volts but enter a conducting state above this potential and serve to protect the relay contacts against the high voltage inductive transient impulses that are generated when the motors are turned on and off.

As described above both motors 142 and 62 in their non-operating condition have ground potential connected to both sides of the motor, so that the motors are externally short-circuited. Due to the construction of the motors used, an external short circuit of the motor terminals will cause the motors to resist rotation. In this manner, the inertial energy of the vertical and rotational motion of the lift apparatus is absorbed when the motors are stopped.

OPERATION

In the operation of this apparatus, with the van door 22 open (FIG. 1), the lift platform is lowered onto the sidewalk or street surface on which the wheel chair rests. With the retainer lip 85 on the lift platform in its lowered, horizontally extended position, the wheel chair is rolled onto the lift platform.

When the user operates the manual switch 110 for raising the lift platform, the first thing that happens is that the retainer lip 85 on the outer edge of the lift platform is pivoted up to the raised position shown in FIG. 1, so as to engage the back of the wheels and prevent the wheel chair from accidentally rolling off the lift platform. The initial action takes place as follows:

The manual "raise" switch (110) turns on the motor 142 which drives the lead screw 54 in a direction for raising the ball nut 48. The upward movement of the ball nut is imparted first to the unitary assembly of the three-sided ball nut carrier 48*a*, the upper and lower plates 49 and 50, and the guide post 51, so that this unitary assembly first moves up about an inch from the phantom line position in FIG. 6*a* to the full line position. The carriage 40 remains stationary during this initial movement and the unitary ball nut assembly moves up with respect to the guide sleeve 55 fixed to the carriage. This initial upward movement of the ball nut is imparted through the actuating train shown on FIGS. 6*a* and 6*b* to the retainer lip 85 to pivot the latter up to its wheel-retaining position, shown in FIG. 6.

Continued rotation of the lead screw 54, after the bottom plate 50 in the lost motion coupling engages the lower end of the guide sleeve 55, now causes the carriage 40 to move up in unison with the ball nut assembly. The carriage 40 slides up along the vertical post 26 carrying the lift platform with it. This lost motion upward movement of the bottom plate 50 also releases the actuator 135 for the lower limit switch 133, so that the release of this switch occurs when the lead screw 54 begins to carry the weight of the carriage, framework and lift platform.

When the upper limit switch actuator 96 is operated, the lead screwmotor 142 is turned off. This happens when the lift platform has reached its upper vertical position.

The next step is to rotate the post 26 to bring the lift platform from its raised position outside the vehicle to a raised position inside the vehicle. This may happen automatically following the actuation of the upper limit switch 136 or it may be effected through operation of the toggle switch 111. In either case the motor 62 now is turned on and through the pinion 60 and gear sector 59 it rotates the post 26 in a direction to swing the lift platform inside the van slightly above the floor of the van.

At the completion of this operation, the post drive motor 62 is turned off, either automatically or manually and motor 142 is energized, either automatically or through a manual switch, to drive the lead screw 54 in the reverse direction for lowering the ball nut assembly. The lift platform is lowered onto the floor of the van and then as the lead screw 54 continues to run in reverse it causes the ball nut assembly to move down with respect to the now-stationary guide sleeve 55 and the carriage 40. This causes the actuating train to lower the retaining lip 85 on the lift platform, so that the wheel chair can be rolled off the lift platform onto the floor of the van.

When the wheel chair is to be moved out of the van onto the sidewalk, for example, the foreoing operating sequence is reversed.

It will be evident from the foregoing that the lost motion coupling which acts between the ball nut 48 and the carriage insures that the retaining lip 85 on the lift platform will be in its raised position whenever the lead screw 54 is carrying the weight of the lift platform. The retaining lip 85 will be down only when the lift platform has its weight resting on some support surface, such as the van floor or the sidewalk outside.

With the lead screw drive motor 142 stopped, the weight of the wheel chair and its occupant on the lift platform, acting through the low friction coupling between the ball nut 48 and the lead screw 54, is prevented from slowly rotating the lead screw in a direction for lowering the lift platform because of the frictional restraint exerted by the electric brake 143. Accordingly, under these circumstances the lift platform cannot coast down along the lead screw.

In case electric power should fail so that the control components including the motors cannot be operated by power, provisions have been made to insure that they can be moved both vertically or horizontally by manual means. In case the platform has to be moved vertically, a hand crank 161 as shown in FIG. 9 is provided as one of the implements of the present apparatus. The hand crank has a square tap 162 which mates with the square hole 79 in the top of the collar 80 on top of lead screw 54, shown in FIG. 9. Since the motor 62 for rotating the platform is connected to the rotatable post 26 through a set of gear wheels having a high turns ratio, provisions are made for disengaging the pinion 60 from the gear sector 59. Disengagement is performed by first lifting the handle 126 of the wedge assembly generally at 130 in FIG. 3. By lifting the handle 126 the wedge 122 is retracted from its normal position between the vertical lip 124 and the extension 128 of gear unit 61. Removed from its normal position the pivotable gear and motor assembly generally at 121 in FIG. 3 and mounted on the plate 63 which is pivotable about the vertical post 64, (FIG. 3) can be rotated clockwise a small angle so as to disengage pinion 60 (FIG. 2) from gear wheel sector 59. After disengagement, the rotatable post 26 can be rotated manually using a rod lever as a past implement handle. that can be inserted into a matching post adaptation 88 (FIG. 9), which shows the post implement as a rod 88*a* and the post adaptation as a hole 88, drilled diagonally through the upper cylindrical part of the post 26.

We claim:

1. In a wheel chair lift platform comprising:

a horizontal lift platform;

a rotatable vertical support post;

a carriage slidable along said support post and operatively coupled to said support post to turn in usison with it;

means rigidly connecting said lift platform to said carriage for movement in unison with it;

a rotatable, vertical power driven lead screw for raising and lowering said carriage along said support post;

retractable retainer means operatively pivotally associated along the rear edge of said lift platform for movement between a retracted position in which it permits the wheel chair to move onto or off the platform and a raised position in which it retains the wheel chair on the lift platform;

motors for raising and lowering the aforesaid carriage along said rotatable post and for turning said post between its inner and outer positions; and control means for connecting said disconnecting electrical power to said motors;

the improvement which comprises:

on-center retainer actuating train means operatively connected with said carriage such that said retainer actuating train means is operated from a retracted to a raised position when said carriage is supporting the weight of said lift platform;

reinforcing means associated with said retainer actuating train means such that said retainer actuating train means is capable of retaining a wheel chair positioned on the lift platform;

a lost motion coupling consisting of a ball nut threadedly engaging said lead screw;

said ball nut attached to a ball nut housing consisting of upper and lower horizontal elongated plates;

said plates attached to a cylindrical vertical guide post;

said post slidably coaxially disposed inside a vertical tubular cylindrical sleeve rigidly attached to said slidable carriage, where said guide post is longer than said sleeve by a short amount, such that said ball nut housing is vertically movable between an upper and lower position relative to said carriage by a distance equal to said short amount;

a first actuating generally vertical rod with its upper end in a loosely jointed connection attached to aforesaid ball nut housing and with its lower end pivotally attached to a lever at a point on said lever that is generally midway between the two ends of the lever;

said lever extending generally horizontally and radially from the axis of the aforesaid pivotable vertical post attached pivotally in a vertical plane to said carriage at the end of the lever nearest to said axis, and such that the end of the lever farthest away from said axis desribes a vertical arch between an upper and lower position in unison with the upper and lower positions of the aforesaid ball nut housing;

a second actuating rod attached to the end of said lever farthest away from said axis in a loosely jointed connection and sloping generally downward to a point of rigid attachment to a stirrup positioned as an inverted U with its two prongs pointing downward in extension of said second actuating rod with the lower ends of said prongs pivotally attached to the apex closest to the rear edge of said platform of two actuators shaped as two obtuse triangles disposed in two parallel vertical planes where said actuators are attached pivotally in a vertical plane about a pivot pin disposed horizontally and parallel with the rear edge of said platform; and through that apex of said triangular actuators that is nearest to the upper surface of said platform; and through a hole in a vertical first projection, said first projection disposed in a vertical plane parallel with and between the vertical planes defining said actuators;

said projection, rigidly attached to the upper surface of said platform and such that the third apex of said triangular actuators can describe an arch of generally 90 degrees in the vertical plane as said actuators are pivoted from a generally horizontal position oriented toward the front edge of said platform to a generally vertical position, as said second actuation rod is operated between its upper and lower position by aforesaid lever;

an actuating bar, at one end generally horizontally oriented, disposed in a vertical plane perpendicular to the rear edge of said platform between said actuators attached at one end pivotally to the third apex of said triangular actuators and at the other end attached pivotally to a second projection attached to the upper surface of aforesaid retaining lip attached pivotably to the rear edge of said platform such that as the aforesaid two triangular actuators are pivoted between their horizontal and vertical positions, said actuating bar will operate said retaining lip to pivot between its raised position and its retracted position in which it is generally co-planar with said platform and such that in its raised position the three points namely the point of attachment between said second projection and said actuating bar, the point of attachment between said triangular actuators and said first projection and the point of attachment between said actuating bar and said triangular actuators are disposed on a straight line thereby placing said two last-mentioned points on center with the first-mentioned point of attachment.

2. Apparatus as recited in claim 1 further comprising: direct drive speed reduction gears between said motors and said rotatable post and said lead screw.

3. Apparatus as recited in claim 2 further comprising: means for braking the rotation of said motors when power to the motors is disconnected;

said braking means consisting of an electrically actuated brake connected to the drive shaft of said motors.

4. Apparatus as recited in claim 3 further comprising: toggle switches with said control means responsive to said toggle switches;

first relay means responsive to said toggle switches such that electrical contacts associated with said relay means are capable of connecting power to said motors to operate them in their forward rotational direction or in their reverse direction.

5. Apparatus as recited in claim 4 where said control means further comprise:

limit switches responsive to actuators where said actuators which are mechanically attached to said vertically slidable carriage and to said rotatable post operatively engage said limit switches to disconnect power to said motors when said carriage or said post enter the limits of their movement.

6. Apparatus as recited in claim 5 where said control means further comprises:

second relay means operatively responsive to the limit switch for the upper limit of said slidable carriage such that said second relay means may enable rotation of said rotatable post with said carriage and lift platform slidably attached thereto only when said carriage is at its upper limit of its movement.

7. Apparatus sa recited in claim 1 further comprising:

a helical spring disposed coaxially with the aforesaid first actuating rod in a compressed condition such that said helical spring at its upper end rests against the underside of said ball nut housing and at its lower end against the upper side of the aforesaid lever and such that when said ball nut housing is at its lower position of its lost motion with all the elements of aforesaid actuating train means in their lower position for retracting said retaining lip, said helical spring will impart to all said elements a degree of downward pressure which is further imparted to said retaining lip in its retracted position so that it will rest firmly against the ground or the floor of the van.

8. Apparatus as recited in claim 2 wherein said rotatable vertical support post at its one end is further equipped with an adaptation for engagement with a matching post implement such that in the case of failure of the drive motor for rotation of said post said rotatable post can be rotated manually by engaging said post implement with said post adaptation and where said lead screw at one end is equipped with a lead screw adaptation for engagement with a matching lead screw implement such that in the case of failure of the motor for turning said lead screw, said screw can be turned manually by engaging said lead screw implement with said lead screw adaptation.

9. Apparatus as recited in claim 8 further comprising:

means for manually detaching said motor and gear reduction assembly for rotating said post from engagement with said post;

said means consisting of a horizontally slidable retractable wedge which in its engaged position locks said motor and gear reduction assembly in its normal position in engagement with said rotatable post and which in its retracted position unlocks said assembly which is horizontally pivotable about a vertical pivot post such that the assembly can be pivoted away from engagement with said post, and such that the rotatable post may be manually rotated using aforesaid post implement.

* * * * *